United States Patent
Chang et al.

(10) Patent No.: US 10,013,134 B1
(45) Date of Patent: Jul. 3, 2018

(54) SYSTEM AND METHOD FOR DETERMINING QUALITY OF SERVICE IN A VIDEO GAME BASED ON PRIORITY

(71) Applicant: Electronic Arts Inc., Redwood City, CA (US)

(72) Inventors: David Chang, San Francisco, CA (US); Timothy Villanueva, Los Gatos, CA (US); Amit Ranade, San Francisco, CA (US); Clifford J. Harrington, San Francisco, CA (US); Daniel Williams, Mountain View, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 13/693,921

(22) Filed: Dec. 4, 2012

Related U.S. Application Data

(63) Continuation of application No. 13/330,320, filed on Dec. 19, 2011, now abandoned.

(51) Int. Cl.
| | |
|---|---|
| *G06Q 10/00* | (2012.01) |
| *A63F 9/24* | (2006.01) |
| *A63F 13/00* | (2014.01) |
| *G06F 17/00* | (2006.01) |
| *G06F 19/00* | (2018.01) |
| *G06F 3/048* | (2013.01) |

(52) U.S. Cl.
CPC .................................. *G06F 3/048* (2013.01)

(58) Field of Classification Search
USPC ............................................................ 705/7
See application file for complete search history.

(56) References Cited

U.S. PATENT DOCUMENTS

| | | | |
|---|---|---|---|
| 6,219,045 B1 | 4/2001 | Leahy et al. ................... 345/331 |
| 6,329,986 B1 | 12/2001 | Cheng ........................... 345/419 |
| 6,396,509 B1 | 5/2002 | Cheng ........................... 345/706 |
| 6,758,746 B1 * | 7/2004 | Hunter et al. ..................... 463/9 |
| 6,993,494 B1 * | 1/2006 | Boushy et al. .............. 705/7.31 |
| 7,403,487 B1 * | 7/2008 | Foladare et al. .............. 370/252 |
| 7,904,577 B2 | 3/2011 | Taylor .......................... 709/230 |
| 7,918,734 B2 * | 4/2011 | Gould ............................. 463/42 |
| 7,987,268 B2 | 7/2011 | Chen et al. ................... 709/226 |
| 8,046,464 B2 | 10/2011 | Wang et al. .................. 709/226 |
| 8,069,168 B2 | 11/2011 | Fitzpatrick et al. .......... 707/732 |
| 2002/0046406 A1 * | 4/2002 | Chelehmal et al. ............ 725/87 |

(Continued)

OTHER PUBLICATIONS

Thawonmas, et al, "Detection of MMORPG Bots Based on Behavior Analysis", 2008, ACM, Advances in Computer Entertainment Technology, Yokohama, Japan.*

(Continued)

*Primary Examiner* — Leland Marcus
(74) *Attorney, Agent, or Firm* — Knobbe, Martens, Olson & Bear, LLP

(57) ABSTRACT

A virtual space may be provided to users. In providing the virtual space to users, actions performed in the virtual space responsive to user input may be dynamically assigned a quality of service that is dependent on one or more of user value, past user action requests, past action requests cumulatively for all users, server health, and/or other criteria. This may facilitate an operator of the virtual space increasing overall user engagement and/or value, and/or provide other enhancements.

14 Claims, 2 Drawing Sheets

(56) References Cited

U.S. PATENT DOCUMENTS

| | | | |
|---|---|---|---|
| 2002/0119821 A1* | 8/2002 | Sen et al. .................... | 463/42 |
| 2003/0154174 A1* | 8/2003 | Tassel et al. ................. | 705/412 |
| 2004/0230444 A1* | 11/2004 | Holt et al. .................... | 705/1 |
| 2005/0120160 A1 | 6/2005 | Plouffe et al. ................ | 711/1 |
| 2007/0210937 A1 | 9/2007 | Smith et al. ............... | 340/995.1 |
| 2008/0115121 A1 | 5/2008 | Douceur et al. ............. | 717/168 |
| 2010/0095213 A1 | 4/2010 | Koster et al. ................ | 715/733 |
| 2010/0241692 A1 | 9/2010 | Klee et al. .................... | 709/203 |
| 2011/0065500 A1* | 3/2011 | Gould ............................ | 463/29 |
| 2011/0218045 A1* | 9/2011 | Williams et al. .............. | 463/42 |
| 2012/0225722 A1* | 9/2012 | Holder et al. ................. | 463/42 |

OTHER PUBLICATIONS

Briceño, Luis Diego, et al. "Robust Resource Allocation in a Massive Multiplayer Online Gaming Environment"; Apr. 2009; ICFDG 2009, Apr. 26-30, 2009, Orlando, FL, USA; Copyright 2009 ACM 978-1-60558-437-9.*

Hyman, Paul; "MMOG Business Models: Cancel That Subscription!"; Jun. 5, 2008; published online at www.gamasutra.com.*

Marzolla, Moreno, et al.; "Dynamic Resource Provisioning for Cloud-Based Gaming Infrastructures"; Nov. 2012; ACM Computers in Entertainment, vol. 10, No. 3, Article 4.*

Nae, Vlad, et al.; "Dynamic Resource Provisioning in Massively Multiplayer Online Games"; Published online Apr. 5, 2010; IEEE Transactions on Parallel and Distributed Systems, vol. 22, No. 3, Mar. 2011.*

Nae, Vlad, et al.; "Efficient Management of Data Center Resources for Massively Multiplayer Online Games"; IEEE SC2008 Nov. 2008, Austin, Texas, USA 978-1-4244-2835-9/08.*

Nae, Vlad, et al.; "A New Business Model for Massively Multiplayer Online Games"; ICPE'11, Mar. 14-16, 2011, Karlsruhe, Germany; Copyright 2011 ACM 978-1-4503-0519-8/11.*

Kromand, Daniel; "What Gamers Think About Microtransactions"; Dec. 3, 2009; published online at www.gamasutra.com.*

Suznjevic, Mirko, et al; "MMORPG Player actions: Network performance, session patterns and latency requirements analysis"; published May 22, 2009; Multimed Tools Appl (2009) vol. 45 pp. 191-214.*

Oh, Gyuhwan, et al; "Game Design on Item-selling Based Payment Model in Korean Online Games"; 2007; Proceedings of DiGRA 2007 Conference.*

"Electronic Arts at Morgan Stanley Technology, Media & Telecom Conference", Mar. 1, 2011, Fair Disclosure Wire service.*

"Super Rewards to Be Virtual Currency Soultion for Top MMOs"; Jun. 16, 2010, The Financial Times (via Marketwire).*

* cited by examiner

SYSTEM AND METHOD FOR DETERMINING QUALITY OF SERVICE IN A VIDEO GAME BASED ON PRIORITY

FIELD

The disclosure relates to determining quality of service for requested actions to be performed in a virtual space based on one or more of a user value of requesting users, actions previously requested by requesting users, actions previously performed by users cumulatively, server health, and/or other criteria

BACKGROUND

Typically, a system that hosts a virtual space executes an instance of the virtual space for interaction by users. The users interact with the virtual space, in part, by requesting actions to be performed in the instance of the virtual space. Conventional systems handle actions with a quality of service that may be relatively uniform for any requesting user at a time of the request. While the quality of service may vary over time, generally, the quality of service assigned to an action does not vary based on the requesting user.

SUMMARY

One aspect of the disclosure relates to a system and method of providing a virtual space to users. In providing the virtual space to users, actions performed in the virtual space responsive to user input are dynamically assigned a quality of service that is dependent on one or more of user value, past user action requests, past action requests cumulatively for all users, server health, and/or other criteria. This may facilitate an operator of the virtual space increasing overall user engagement and/or value, and/or provide other enhancements.

In some implementations, the system may include a server that communicates with client computing platforms associated with the users in a client/server configuration. The server may include one or more processors configured to execute one or more of a space module, a financial value module, an engagement module, a user value module, a user activity module, an instance activity module, a server health module, a quality of service module, and/or other modules.

The space module may be configured to host a virtual space. This may include executing an instance of the virtual space, and implementing the instance of the virtual space to determine views of the virtual space for communication to client computing platforms associated with users. The space module may be configured to receive input commands from the users via the client computing platforms. The input commands may indicate actions that should be taken in the instance of the virtual space. Responsive to reception of the input commands, the space module may initiate actions in the instance of the virtual space that correspond to the input commands such that the actions are reflected in the views of the virtual space determined by the space module.

The financial value module may be configured to determine and/or quantify a financial value of individual users to an operator of the virtual space. The financial value module may be configured to determine values of a financial value metric that indicates the financial value of individual users to the operator of the virtual space. The financial value metric may reflect previous financial expenditures by the users in the virtual space, a subscription level of the users in the virtual space, other expenditure of real world value to the operator of the virtual space, advertizing conversion, and/or other sources of financial value to the operator of the virtual space.

The engagement module may be configured to determine and/or quantify user engagement of individual users with the virtual space. The engagement module may be configured to determine values of an engagement metric that indicates a level of user engagement with the virtual space. The engagement value metric may reflect length of usage sessions, frequency of usage sessions, periods of time between usage sessions, amount of time users have had accounts with the virtual space, and/or other criteria.

The user value module may be configured to determine overall user value for individual users. The user value module may be configured to determine values for a user value metric for the individual users. The determination of a value for the user value metric for a given user may be based on determinations made by the financial value module and/or the engagement module. For example, the value of the user value metric for the given user may be based on the value for the financial value metric and/or the value for the engagement metric. As such, the user value for the given user determined by the user value module may reflect the financial value of the given user to the operator of the virtual space and/or the engagement of the given user in the virtual space.

The user activity module may be configured to monitor actions performed in the instance of the virtual space responsive to input commands received from the individual users on a per-action-type basis. The action types may include, for example, one or more of an attack type, a defense type, an exploring type, a travel type, a resource cultivation and/or extraction type, and/or other types. Such monitoring may include determining metrics for a given user on a given action-type based on one or more of an action-type frequency, a number of actions within the action-type performed in a given time period, and/or other parameters of action performance within the given action-type.

The instance activity module may be configured to monitor actions performed in the instance of the virtual space responsive to input commands received from the users cumulatively on a per-action-type basis. Such monitoring may include determining metrics for a given action-type based on one or more of an action-type frequency, a number of actions within the action-type performed in a given time period, and/or other parameters of action performance within the given action-type.

The server health module may be configured to monitor a health level of server. The health of server may be quantified by one or more parameters that indicate responsiveness and/or functionality of the server. For example, the server health module may be configured to determine one or more of CPU usage, available storage space, a proportion of CPU cycles waiting for 10 (e.g., disk or network) events (or "10 wait"), a proportion CPU cycles spent performing kernel-level processing (or "System"), a proportion of CPU cycles spent performing user instigated processing (or "User"), spare CPU capacity (or "Idle"), load average, disk 10, network traffic, RAM usage, system uptime, and/or other parameters.

The quality of service module may be configured such that responsive to reception of an input command from a first user, the quality of service module determines a quality of service for the action indicated by the input command. The quality of service may be determined based on one or more of the user value metric for the first user and a requested action indicated by the input command. The quality of service module may be further configured such that determination of the quality of service for the requested action is further based on the actions of a common action-type with the requested action previously initiated in the instance of the virtual space responsive to input commands from the first user. For example, the quality of service for the requested action may be determined to be relatively low responsive to an action frequency for the common action-type initiated by the first user being relatively high, and to be relatively high responsive to the action frequency for the common action-type initiated by the first user being relatively low. The quality of service module may be further configured such that determination of the quality of service for the requested action may be further based on the actions of a common action-type with the requested action previously initiated in the instance of the virtual space responsive to input commands from the users cumulatively. For example, the quality of service for the requested action may be determined to be relatively low responsive to an action frequency for the common action-type initiated by the users cumulatively being relatively high, and to be relatively high responsive to the action frequency for the common action-type initiated by the users cumulatively being relatively low. The quality of service module may be further configured such that determination of the quality of service for the requested action is further based on the health level of the server.

The space module may be further configured such that responsive to the determination of the quality of service for the requested action, the requested action is initiated in the instance of the virtual space with the determined quality of service. This may result in the requested action being executed with resources commiserate with the value of the first user, the current activity level of the first user, the current activity level of the users cumulatively, the server health, and/or other criteria.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
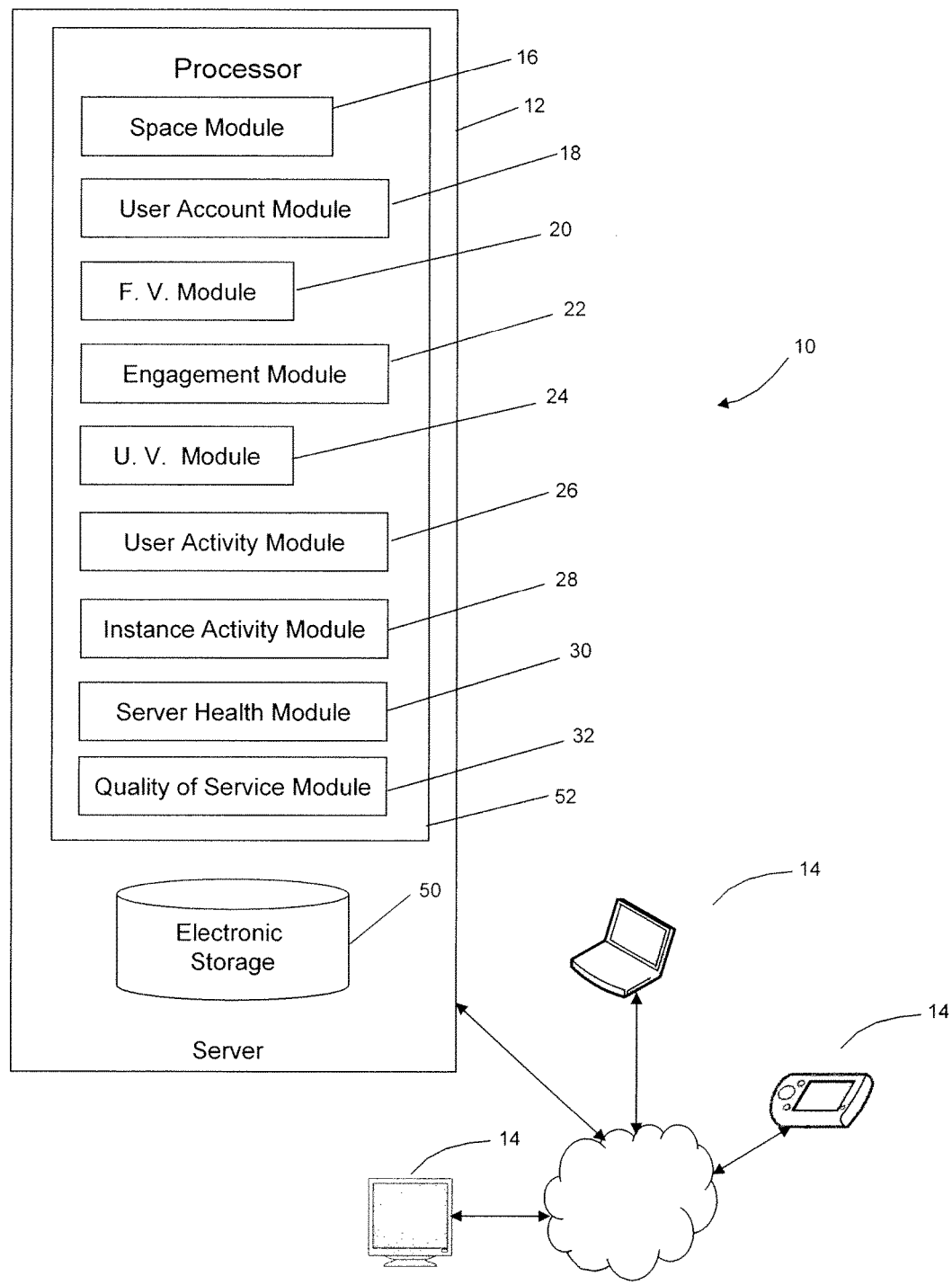
FIG. 1 illustrates a system configured to provide a virtual space to users.

FIG. 1 illustrates a system 10 configured to provide a virtual space to users. System 10 is configured such that limited processing, storage, communication bandwidth, and/or other resources may be allocated to user requests based on one or more of user value, activities of the individual users in the virtual space, activities of the users cumulatively in the virtual space, server health, and/or other parameters. This may be done by dynamically assigning quality of service to actions performed responsive to users requests based on the aforementioned (and/or other) parameters. User value for individual users may be determined based on past monetary expenditures in the virtual space, engagement with the virtual space, and/or other parameters.

In some implementations, system 10 may include a server 12. Server 12 may be configured to communicate with one or more client computing platforms 14 according to a client/server architecture. The users may access system 10 and/or the virtual game environment via client computing platforms 14.

Server 12 may be configured to execute one or more computer program modules. The computer program modules may include one or more of an a space module 16, a user account module 18, a financial value module 20, an engagement module 22, a user value module 24, a user activity module 26, an instance activity module 28, a server health module 30, a quality of service module 32, and/or other modules.

Space module 16 may be configured to host a virtual space for access by users via client computing platforms 14. This may include executing an instance of the virtual space, and implementing the instance of the virtual space to determine view information representing views of the virtual space. The view information may then be communicated from server 12 to client computing platforms 14 to facilitate presentation of the views to the users. The users may participate in the virtual space by inputting input commands to their respective client computing platforms 14 that request an action to be taken within the instance of the virtual space (e.g., manipulate an object, control a character, speak to another character, and/or other actions). The input commands may be transmitted from client computing platforms 14 to server 12, and received by space module 16. Responsive to reception of the input commands, space module 16 may initiate the requested actions in the instance of the virtual space such that the actions are reflected in the views of the virtual space determined by space module 16.

A virtual space may comprise a simulated space that is accessible by users via clients (e.g., client computing platforms 14) that present the views of the virtual space to a user. The simulated space may have a simulated physical layout, express ongoing real-time interaction by one or more users, and/or be constrained by simulated physics that governs interactions between virtual objects in the simulated space. In some instances, the simulated physical layout may be a 2-dimensional layout. In other instances, the simulated physical layout may be a 3-dimensional layout. An instance of a virtual space may be persistent. That is, the instance of the virtual space may continue to exist whether or not any given user (or set of users) are currently logged in and/or receiving view information.

The above description of virtual spaces is not intended to be limiting. Space module 16 may be configured to express the virtual space in a more limited, or more rich, manner. For example, views of the virtual space presented to the users may be selected from a limited set of graphics depicting an event in a given place within the virtual space. The views may include additional content (e.g., text, audio, pre-stored video content, movable icons, avatars, and/or other content) that describes particulars of the current state of the space, beyond the relatively generic graphics. For example, a view of the virtual space may depict a given location in a relatively static manner that may or may not include representations of the characters present at the location. Text may be used to express the actions of the characters present at the location (and/or effects of the actions), and/or actions of the characters (and/or effects) may be represented with a relatively limited set of still images and/or short animations. For example, a battle, a meeting, a game, and/or other activities at the given location may be depicted in this manner. Other expressions of individual places within the virtual space are contemplated.

Within the instance of the virtual space (or other virtual environment) executed by space module 16, users may control avatars to interact with the virtual space and/or each other. As used herein, the term "avatar" may refer to an object (or group of objects) present in the virtual space that represents an individual user. The avatar may be controlled by the user with which it is associated. The avatars may move through and interact with the virtual space (e.g., non-user characters in the virtual space, other objects in the virtual space), or the avatars may be relatively static visually within views of virtual space. The avatar representing a given user may be created and/or customized by the given user. The user may have an "inventory" of virtual goods and/or currency that the user can use (e.g., by manipulation of an avatar or other user controlled element, and/or other items), display, gift, and/or otherwise interact with within the virtual space.

User account module 18 may be configured to manage accounts associated with the individual users. The accounts may include user information associated with the individual users. Such user information may include one or more of identification information, inventory information, financial information, relationship information, information related to the users determined by one or more of the other modules 16, 20, 22, 24, 26, 28, 30, and/or 32, demographic information, usage information, past purchase history, and/or other information related to the users. The identification information may include one or more of a username, an avatar name, a real world identification, and/or other identification information. The inventory information may identify virtual objects, virtual currency, and/or other assets available to the users. The virtual objects and/or virtual currency available to a given user may include the virtual objects and/or the virtual currency that is under the control of the given user within the virtual space. The financial information may include payment information such as an account identification that identifies an account that can be used by the user to purchase virtual goods and/or virtual currency for use within the virtual space. The funds available in the account may include real world money or funds, virtual money or funds that are not usable within the virtual space, and/or other funds. The relationship information may indicate associations between users. These associations may include one or more of friendships, links, guild-mates, faction-mates, and/or other relationships. The associations may be formed affirmatively by the users (e.g., through a request and answer), formed intrinsically within the virtual space (e.g., faction-mates are formed based on avatar configuration), recognized through user behavior over time (e.g., raid members or player-versus-player partners), and/or other associations.

Financial value module 20 may be configured to determine values of a financial value metric for the individual users. The value of the financial value metric determined for a given user may quantify the financial value of the given user to an operator of the virtual space (e.g., an operator of system 10). Values for the financial value metric may be determined based on expenditures by the users in the virtual space. The expenditures used to determine financial value metric may include expenditures by the users having quantifiable real world value. By way of non-limiting example, such expenditures may include one or more of a purchase of a virtual currency for use in the virtual space with real world value (e.g., with real world funds, with virtual funds not usable within the virtual space, and/or with other real world value), a purchase of a virtual good for use in the virtual space with real world value, a purchase of a virtual good for use in the virtual space with virtual currency of the virtual space (e.g., virtual currency that was previously purchased with real world value), other purchases for use in the virtual space, a subscription level of the user, and/or other expenditures.

Financial value module 20 may be configured to determine values of the financial value metric based on other parameters instead of or along with expenditures in determining values of the financial value metric. For example, a first user may be more financially valuable than a second user based on an advertizing conversion rate of the first user. That is, the first user may take actions with respect to advertisements that are presented within the virtual space that enable the virtual space operator to collect money from an advertiser. These actions may include one or more of accessing an external website associated with an advertisement (e.g., through selection of a link), purchasing an advertised good and/or service, and/or other actions that are chargeable by the virtual space operator to an advertiser. As another non-limiting example, a first user may be more financially valuable than a second user based on a number of new users the first user brings to the virtual space. Other parameters for determining values of financial value metric for the users may be used.

Financial value module 20 may be configured such that the values of the financial value metric are determined based on a temporally limited amount of information. For example, expenditures and/or other actions may be included determination of the financial value metric only if they have taken place within some sliding window of time (e.g., the previous week, month, year, etc.). Financial value module 20 may be configured such that determination of the values of the financial value metric includes weighting expenditures and/or other actions based on the time at which they occurred. This may ensure that expenditures and/or actions that have occurred more recently are more heavily reflected in the quantification provided by the values of the financial value metric.

Engagement module 22 may be configured to determine values of an engagement metric for the individual users. The value of the engagement metric determined for a given user may quantify the level of engagement of the given user in the virtual space. The value of the engagement metric for the given user may be determined based on, for example, one or more of a length of time the given user has had an account in the virtual space, a length of usage session(s) of the given user (e.g., an average usage session length), usage session frequency, a period of between a current usage session and a previous usage session, a number of friendships the given user has with other users, a level of the user in the virtual space, and/or other mechanisms for quantifying user engagement. Engagement module 22 may be configured such that the usage sessions and/or actions used to determine values for the engagement metric may be temporally limited. For example, usage sessions and/or actions may be included in determination of the engagement metric only if they have taken place within some sliding window of time (e.g., the previous week, month, year, etc.). Engagement module 22 may be configured such that determination of the values of the engagement metric includes weighting usage session and/or actions based on the time at which they occurred. This may ensure that expenditures and/or actions that have occurred more recently are more heavily reflected in the quantification provided by the values of the engagement metric.

User value module 24 may be configured to determine user values of the individual users of the virtual space. The user values may reflect the financial value of the individual users, the engagement of the individual users, and/or other aspects of the relationship between the individual users and the virtual space or the operator thereof. The user values may be determined based on one or both of the financial value metric and/or the engagement metric determined by modules 20 and 22, respectively. Determination of the user values may include determining values of a user value metric for the individual users.

In determining values of the user value metric, user value module 24 may be configured to implement the values of the financial value metric. The determination of the values of the user value metric may be configured such that the higher a value for the financial value metric determined for a given user, the higher the value of the user value metric for the given user will be. This may ensure that users that are more financially valuable are determined to have relatively higher user value, while users that are less financially valuable are determined to have relatively less user value.

In determining values of the user value metric, user value module 24 may be configured to implement the values of the engagement metric. The determination of the values of the user value metric may be configured such that the higher a value for the engagement metric determined for a given user, the lower the value of the user value metric for the given user will be. Conversely, a relatively low value for the engagement metric for the given user may produce a higher value of the user value metric for the given user. At first, this determination may seem counterproductive, but this relationship between the engagement metric and the user value metric may be effective at enhancing overall user engagement.

For example, users having lower levels of engagement with the virtual space may be viewed as having greater potential for increasing in value than users having higher levels of engagement. By way of illustration, a user that is new to the virtual space or a user that used to participate in the virtual space but has been absent for some time, may not be determined to have high values for the engagement metric. However, each of these users have the potential to become more engaged in the virtual space, which may lead to the users becoming far more financially valuable to the operator of the virtual space than they currently are. On the other hand, users that are heavily engaged in the virtual space may be unlikely to significantly increase in financial value to the operator of the virtual space. As such, this determination of user value may result in server resources being allocated to users in a manner that may enhance future financial value of users.

User activity module 26 may be configured to monitor actions performed in the instance of the virtual space responsive to input commands received from the individual users on a per-action-type basis. The action types may include, for example, one or more of an attack type, a defense type, an exploring type, a travel type, a resource cultivation and/or extraction type, and/or other types. Such monitoring may include determining metrics for a given user on a given action-type based on one or more of an action-type frequency, a number of actions within the action-type performed in a given time period, and/or other parameters of action performance within the given action-type.

Instance activity module 28 may be configured to monitor actions performed in the instance of the virtual space responsive to input commands received from the users cumulatively on a per-action-type basis. Such monitoring may include determining metrics for a given action-type based on one or more of an action-type frequency, a number of actions within the action-type performed in a given time period, and/or other parameters of action performance within the given action-type.

Server health module 30 may be configured to monitor a health level of server 12. The health of server 12 may be quantified by one or more parameters that indicate responsiveness and/or functionality of server 12. For example, server health module 30 may be configured to determine one or more of CPU usage, available storage space, a proportion of CPU cycles waiting for 10 (e.g., disk or network) events (or "10 wait"), a proportion CPU cycles spent performing kernel-level processing (or "System"), a proportion of CPU cycles spent performing user instigated processing (or "User"), spare CPU capacity (or "Idle"), load average, disk 10, network traffic, RAM usage, system uptime, and/or other parameters.

Quality of service module 32 may be configured to determine quality of service to be provided by space module 16 in initiating and/or carrying out individual actions requested by input commands from the users. The quality of service determined for and/or assigned to a given action by quality of service module 32 may impact the resources dedicated to the action by space module 16. Such resources may include, for example, processing, storage, communication bandwidth, and/or other resources. The quality of service assigned to the given action may impact the speed at which the action is initiated and/or performed, a resolution of the representation of the action in the views of the virtual space, an effectiveness of the action in the virtual space, a rate at which the given action will be executed for the user in response to successive requests (and/or a waiting time between performance of the given action) (a higher rate would correspond to a higher quality of service), and/or other factors of the action.

Quality of service module 32 may be configured such that the quality of service determined for a given action requested by a given user may be based on one or more of the user value of the given user, an activity level of the given user for the action-type of the requested action, an activity level of the users cumulatively for the action-type of the requested action, the health of server 12, and/or other parameters. Quality of service module 32 may be configured such that responsive to the given user having a higher user value, the requested action will be assigned a higher quality of service, and responsive to the given user having a lower user value, the requested action will be assigned a lower quality of service. Quality of service module 32 may be configured such that responsive to the activity level of the given user for the action-type of the requested action being high, the requested action will be assigned a lower quality of service, and vice versa. Quality of service module 32 may be configured such that responsive to the activity level of the users cumulatively for the action-type of the requested action being high, the requested action will be assigned a lower quality of service, and vice versa. Quality of service module 32 may be configured such that the more healthy server 12 is, the higher the quality of service assigned to requested action will be.

Space module 16 may be configured such that subsequent to the requested action being assigned a quality of service, space module 16 may initiate the requested action with the assigned quality of service. This may ensure that actions requested by the users may be executed by space module 16 with the appropriate quality of service.

In some implementations, 12 server and client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14.

A given client computing platform 14 may include one or more processors, and electronic display, a control interface, and/or other components. The one or more processors may be configured to execute computer program modules. The computer program modules may be configured to enable or user associated with the given client computing platform 14 to interface with system 10, and/or provide other functionality attributed herein to client computing platforms 14. For example, the computer program modules may include a view module configured to receive view information from server 12 (e.g., generated by space module 16), and to present a view of the virtual game environment (e.g., as described above) based on the received view information. This may facilitate participation by the user of the given client computing platform 14 in the game taking place in the virtual game environment. By way of non-limiting example, the given client computing platform 14 may include one or more of a desktop computer, a laptop computer, a handheld computer, a tablet computing platform, a NetBook, a Smartphone, a gaming console, and/or other computing platforms.

The server 12 may include electronic storage 50, one or more processors 52, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented "in the cloud" by a plurality of computing platforms operating together as server 12.

Electronic storage 50 may comprise electronic storage media that electronically stores information. The electronic storage media of electronic storage 50 may include one or both of system storage that is provided integrally (i.e., substantially non-removable) with server 50 and/or removable storage that is removably connectable to server 50 via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 50 may include one or more virtual storage resources (e.g., cloud storage, a virtual private network, and/or other virtual storage resources). Electronic storage 50 may store software algorithms, information determined by processor 52, information received from server 12, information received from client computing platforms 14, and/or other information that enables server 12 to function as described herein.

Processor(s) 52 is configured to provide information processing capabilities in server 12. As such, processor 52 may include one or more of a digital processor, an analog processor, a digital circuit designed to process information, an analog circuit designed to process information, a state machine, and/or other mechanisms for electronically processing information. Although processor 52 is shown in FIG. 1 as a single entity, this is for illustrative purposes only. In some implementations, processor 52 may include a plurality of processing units. These processing units may be physically located within the same device, or processor 52 may represent processing functionality of a plurality of devices operating in coordination. The processor 52 may be configured to execute modules 16, 18, 20, 22, 24, 26, 28, 30, and/or 32. Processor 52 may be configured to execute modules 16, 18, 20, 22, 24, 26, 28, 30, and/or 32 by software; hardware; firmware; some combination of software, hardware, and/or firmware; and/or other mechanisms for configuring processing capabilities on processor 52.

It should be appreciated that although modules 16, 18, 20, 22, 24, 26, 28, 30, and 32 are illustrated in FIG. 1 as being co-located within a single processing unit, in implementations in which processor 52 includes multiple processing units, one or more of modules 16, 18, 20, 22, 24, 26, 28, 30, and/or 32 may be located remotely from the other modules. As a non-limiting example, some or all of the functionality attributed to modules 16, 18, 20, 22, 24, 26, 28, 30, and/or 32 may be provided "in the cloud" by a plurality of processors connected through a network. The description of the functionality provided by the different modules 16, 18, 20, 22, 24, 26, 28, 30, and/or 32 herein is for illustrative purposes, and is not intended to be limiting, as any of modules 16, 18, 20, 22, 24, 26, 28, 30, and/or 32 may provide more or less functionality than is described. For example, one or more of modules 16, 18, 20, 22, 24, 26, 28, 30, and/or 32 may be eliminated, and some or all of its functionality may be provided by other ones of modules 16, 18, 20, 22, 24, 26, 28, 30, and/or 32. As another example, processor 52 may be configured to execute one or more additional modules that may perform some or all of the functionality attributed below to one of modules 16, 18, 20, 22, 24, 26, 28, 30, and/or 32.

Figure 2:
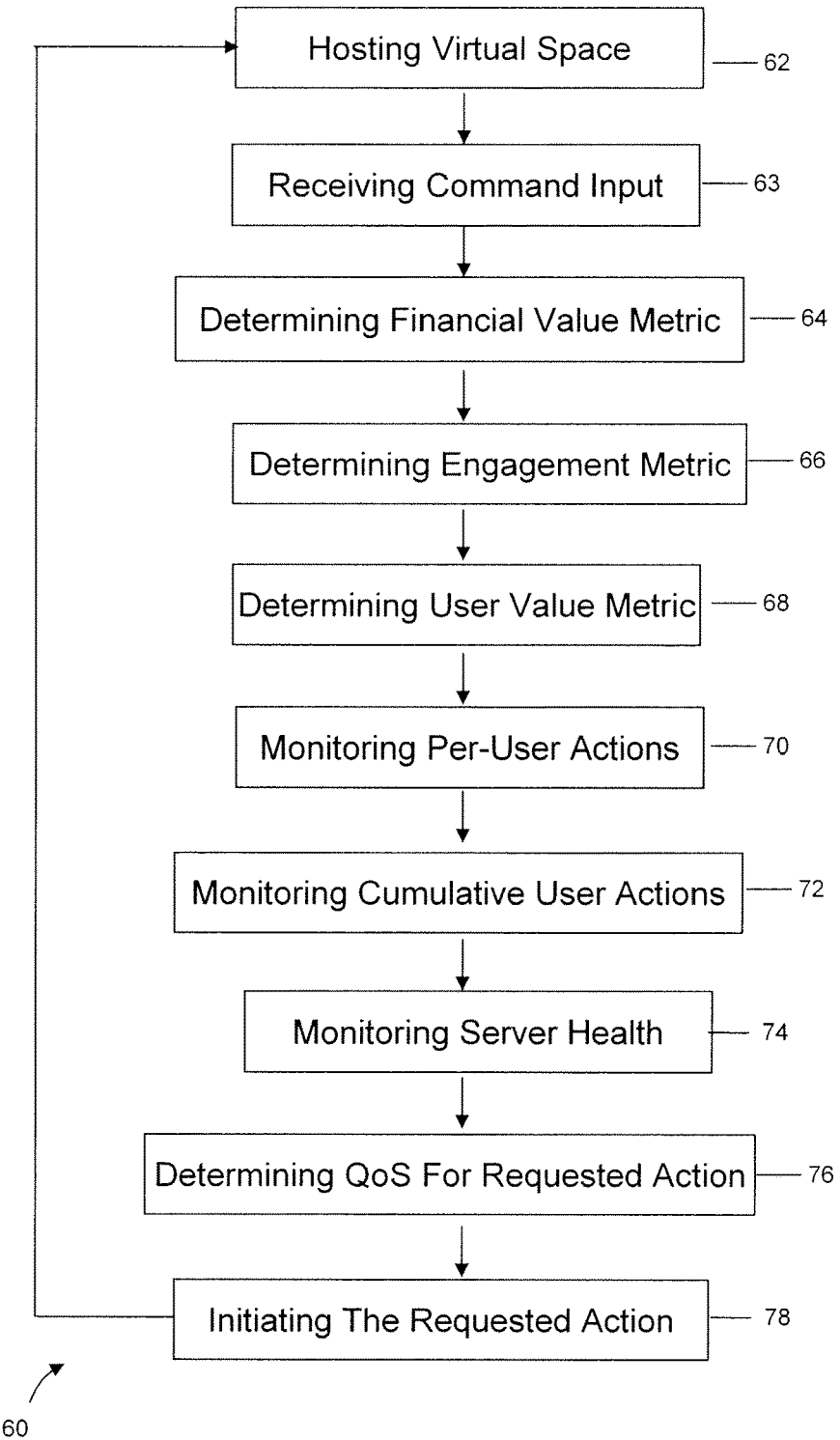
FIG. 2 illustrates a method of providing a virtual space to users.

FIG. 2 illustrates a method 60 of providing a virtual space to users. The operations of method 60 presented below are intended to be illustrative. In some embodiments, method 60 may be accomplished with one or more additional operations not described, and/or without one or more of the operations discussed. Additionally, the order in which the operations of method 60 are illustrated in FIG. 2 and described below is not intended to be limiting.

In some embodiments, method 60 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 in response to instructions stored electronically on an electronic storage medium. The one or more processing devices may include one or more devices configured through hardware, firmware, and/or software to be specifically designed for execution of one or more of the operations of method 60.

At an operation 62, the virtual space may be hosted. Hosting the virtual space may include one or more of executing an instance of the virtual space, using the instance to determine view information that describes views of the virtual space, and/or transmitting the view information to one or more client computing platforms to facilitate presentation of the views to the users. In some implementations, operation 62 may be performed by a space module similar to or the same as space module 16 (shown in FIG. 1 and described herein).

At an operation 63, a command input may be received from a first user. The command input may request an action to be performed in the instance of the virtual space. The command input may have been input by the first user to a client computing platform. In some implementations, operation 63 may be performed by a space module similar to or the same as space module 16 (shown in FIG. 1 and described herein).

At an operation 64, a financial value of users may be determined and/or quantified. Operation 64 may include determining values of a financial value metric for individual users. The financial value metric may reflect the relative financial values of the individual users to an operator of the virtual space. In some implementations, operation 64 may be performed by a financial value module similar to or the same as financial value module 20 (shown in FIG. 1 and described herein).

At an operation 66, an engagement level of users may be determined and/or quantified. Operation 66 may include determining values of an engagement metric for the individual users. The engagement metric may reflect the relative engagement of the individual users with the virtual space. In some implementations, operation 68 may be performed by an engagement module similar to or the same as engagement module 22 (shown in FIG. 1 and described herein).

At an operation 68, user value of the users may be determined. Operation 68 may include determining a user value metric that quantifies the value of the users to the operator of the virtual space. In some implementations, operation 68 may be performed by a user value module similar to or the same as user value module 24 (shown in FIG. 1 and described herein).

At an operation 70, actions requested by users for performance in the instance of the virtual space may be monitored on a per-user, per-action-type basis. This may include monitoring actions requested by the first user that have the same action-type as the requested action. In some implementations, operation 70 may be performed by a user activity module similar to or the same as user activity module 26 (shown in FIG. 1 and described herein).

At an operation 72, actions requested by users for performance in the instance of the virtual space may be monitored on a per-action-type basis for the users cumulatively. This may include monitoring actions requested by the users cumulatively that have the same action-type as the requested action. In some implementations, operation 72 may be performed by an instance activity module similar to or the same as instance activity module 28 (shown in FIG. 1 and described herein).

At an operation 74, a health of a server on which the instance of the virtual space is being executed may be monitored. In some implementations, operation 74 may be performed by a server health module similar to or the same as server health module 30 (shown in FIG. 1 and described herein).

At an operation 76, a quality of service for the requested action may be determined. The quality of service may be determined based on information derived at one or more of operations 64, 66, 68, 70, 72, and/or 74. In some implementations, operation 76 may be performed by a quality of service module similar to or the same as quality of service module 32 (shown in FIG. 1 and described herein).

At an operation 78, the requested action may be initiated and/or performed in the instance of the virtual space with the quality of service determined at operation 76. In some implementations, operation 78 may be performed by a space module similar to or the same as space module 16 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to provide a virtual space to users, wherein the users include a first user and a second user, wherein the users are associated with client computing platforms, wherein the first user is associated with a first client computing platform, the system comprising:

one or more processors configured by machine-readable instructions to:

execute an instance of the virtual space, and use the instance to generate state information that is transmitted to client computing platforms over a network, the state information facilitating presentation of views of the virtual space via the client computing platforms associated with the users, wherein execution of the instance further enables interaction by the users with the virtual space and/or each other by performing operations in the instances of the virtual space in response to commands received over the network from the client computing platforms;

facilitate interaction between the users and the virtual space by receiving input commands from the users via the client computing platforms, wherein the client computing platforms are configured to communicatively link with the system via the network;

receive the input commands from the users via the client computing platforms, the input commands indicating actions that should be taken in the instance of the virtual space, wherein the input commands include a first input command received from the first user via the first client computing platform, the first input command indicating a first action that should be taken in the instance of the virtual space;

determine values for a user value metric for the individual users, wherein the determined values reflect financial values of previous expenditures by the individual users within the virtual space, wherein the determined values include a first determined value for the first user;

determine a first quality of service for the first action indicated by the first input command from the first user, wherein the first quality of service is based on the first determined value for the first user and further based on the first action; and responsive to reception of the input commands including the first input command, initiate actions including the first action in the instance of the virtual space that correspond to the input commands such that the actions are reflected in the views of the virtual space;

wherein responsive to the determination of the first quality of service for the first action, the first action is initiated in the instance of the virtual space with the first quality of service.

2. The system of claim 1, wherein the one or more processors are further configured such that the determinations of the values of the user value metric for the individual users are based on monetary expenditures made by the users for virtual items usable in the virtual space.

3. The system of claim 1, wherein the one or more processors are further configured such that determined values of the user value metric reflect levels of engagement of the individual users with the virtual space.

4. The system of claim 3, wherein the one or more processors are further configured such that the determinations of the values of the user value metric for the individual users are based on one or more of length of usage sessions of the users, frequency of usage sessions of the users, periods of time between usage sessions of the users, or amounts of time the users have been using the virtual space.

5. The system of claim 1, wherein the one or more processors are further configured to monitor actions performed in the instance of the virtual space responsive to input commands received from the individual users on a per-action-type basis, and wherein determination of the first quality of service for the first action is further based on the common action-type of the first action previously initiated in the instance of the virtual space responsive to input commands from the first user.

6. The system of claim 5, wherein the one or more processors are further configured to:
determine a first frequency that reflects a number of actions performed in the virtual space in a given period having an action-type similar to a first action-type of the first action;
receive a second input command from the second user via a second client computing platform, wherein the second input command indicates a second action that should be taken in the instance of the virtual space;
determine a second value for the second user that reflects financial values of previous expenditures by the second user within the virtual space;
determine a second quality of service for the second action indicated by the second input command from the second user, wherein the second quality of service is based on the second determined value for the second user and further based on the second action,
wherein the second action is initiated in the instance of the virtual space with the second quality of service,
determine a second frequency that reflects a number of actions performed in the virtual space in the given period having an action-type similar to a second action-type of the second action,
such that the second quality of service for the second action is determined to be lower than the first quality of service responsive to the second frequency being higher than the first frequency, and such that the second quality of service for the second action is determined to be higher than the first quality of service responsive to the second frequency being lower than the first frequency.

7. The system of claim 1, wherein the one or more processors are further configured to monitor a health level of a server that includes at least one of the one or more processors, and such that determination of the first quality of service for the first action is further based on the health level of the server.

8. A computer-implemented method of providing a virtual space to users, wherein the users include a first user and a second user, wherein the users are associated with client computing platforms, wherein the first user is associated with a first client computing platform, the method being implemented in a computer system comprising one or more processors configured by machine-readable instructions, the method comprising:
executing an instance of the virtual space;
using the instance of the virtual space to generate state information that is transmitted to client computing platforms over a network, the state information facilitating presentation of views of the virtual space via the client computing platforms associated with the users, wherein execution of the instance further enables interaction by the users with the virtual space and/or each other by performing operations in the instances of the virtual space in response to commands received over the network from the client computing platforms;
facilitating interaction between the users and the virtual space by receiving input commands from the users via the client computing platforms, wherein the client computing platforms are configured to communicatively link with the system via the network;
receiving the input commands, at the one or more processors, from the users via the client computing platforms, the input commands indicating actions that should be taken in the instance of the virtual space, wherein the input commands include a first input command received from the first user via the first client computing platform, the first input command indicating a first action that should be taken in the instance of the virtual space;
determining values for a user value metric for the individual users, wherein the determined values reflect financial values of previous expenditures by the individual users within the virtual space, wherein the determined values include a first determined value for the first user;
determining a first quality of service for the first action indicated by the first input command from the first user, wherein the first quality of service is based on the first determined value for the first user and further based on the first action
responsive to reception of the input commands including the first input command, initiating actions including the first action in the instance of the virtual space that correspond to the input commands such that the actions are reflected in the determined views of the virtual space;
wherein responsive to the determination of the first quality of service for the first action, the first action is initiated in the instance of the virtual space with the first quality of service.

9. The method of claim 8, wherein the determinations of the values of the user value metric for the individual users are based on monetary expenditures made by the users for virtual items usable in the virtual space.

10. The method of claim 8, wherein the determined values of the user value metric reflect levels of engagement of the individual users with the virtual space.

11. The method of claim 10, wherein the determined values of the user value metric for the individual users are based on one or more of length of usage sessions of the users, frequency of usage sessions of the users, periods of time between usage sessions of the users, or amounts of time the users have been using the virtual space.

12. The method of claim 8, further comprising monitoring actions performed in the instance of the virtual space responsive to input commands received from the individual users on a per-action-type basis, and wherein the determination of the first quality of service for the first action is further based on the common action-type of the first action previously initiated in the instance of the virtual space responsive to input commands from the first user.

13. The method of claim 12, further comprising:
determining a first frequency that reflects a number of actions performed in the virtual space in a given period having an action-type similar to a first action-type of the first action;
receiving a second input command from the second user via a second client computing platform, wherein the second input command indicates a second action that should be taken in the instance of the virtual space;
determining a second value for the second user that reflects financial values of previous expenditures by the second user within the virtual space;
determining a second quality of service for the second action indicated by the second input command from the second user, wherein the second quality of service is based on the second determined value for the second user and further based on the second action,
wherein the second action is initiated in the instance of the virtual space with the second quality of service,
determining a second frequency that reflects a number of actions performed in the virtual space in the given period having an action-type similar to a second action-type of the second action,
wherein the second quality of service for the second action is determined to be lower than the first quality of service responsive to the second frequency being higher than the first frequency, and such that the second quality of service for the second action is determined to be higher than the first quality of service responsive to the second frequency being lower than the first frequency.

14. The method of claim 8, further comprising monitoring a health level of a server that includes at least one of the one or more processors, and wherein the first quality of service for the first action is further based on the health level of the server.

* * * * *